United States Patent [19]
Cassat

[11] Patent Number: 5,001,405
[45] Date of Patent: Mar. 19, 1991

[54] POSITION DETECTION FOR A BRUSHLESS DC MOTOR

[75] Inventor: Alain M. Cassat, Pully, Switzerland

[73] Assignee: Seagate Technology, Inc., Scotts Valley, Calif.

[21] Appl. No.: 413,311

[22] Filed: Sep. 27, 1989

[51] Int. Cl.⁵ .......................................... H02K 29/00
[52] U.S. Cl. ..................................... 318/254; 318/138
[58] Field of Search ............... 318/138, 254, 439, 430, 318/431

[56] References Cited

U.S. PATENT DOCUMENTS

| | | | |
|---|---|---|---|
| 4,673,849 | 6/1987 | Sears et al. ...................... | 318/138 X |
| 4,678,973 | 7/1987 | Elliott et al. ....................... | 318/254 |
| 4,752,724 | 6/1988 | Radziwill et al. ................ | 318/138 X |
| 4,876,491 | 10/1989 | Squires ............................ | 318/254 X |
| 4,879,498 | 11/1989 | Shinohara et al. .............. | 318/138 X |

OTHER PUBLICATIONS

P. P. Acarnley et al.; "Detection of Rotor Position in Stepping and Switched Motors by Monitoring of Current Waveforms", IEEE Transactions on Industrial Electronics, vol. IE-32, No. 3, Aug. 1985.

Primary Examiner—Bentsu Ro
Attorney, Agent, or Firm—Flehr, Hohbach, Test, Albritton & Herbert

[57] ABSTRACT

The present method and apparatus detects the position with an accuracy of $\pi/m$ electrical radians (where m=the number of motor phases) within one electrical period, and provides enough information to be able to start in the correct direction with certainty. After starting the motor in an open loop mode of one or two steps, starting the rotor in the correct direction, the closed loop mode may be switched on, using a dynamic indirect position detection as is already well known in the technology.

More specifically, the position at start is determined by the injection of short current pulses in different motor phases, each phase or pair of phases being energized first by a pulse of one polarity and of the opposite polarity. The sign of the difference between the induced voltages is detected. By performing a succession of these tests on different phases or pairs of phases of the standing motor, a table of results is established which clearly defines the position of the rotor relative to the motor phases. The same table then defines when polarity currents should be applied to each phase to reliably and certainly start the motor in the proper direction.

16 Claims, 8 Drawing Sheets

Flux Distribution ÷ Torque ÷ Sign of the current difference

POSITION DETECTION FOR A BRUSHLESS DC MOTOR

CROSS-REFERENCE TO A RELATED APPLICATION

The present invention is useful in a motor such as shown in U.S. Pat. No. 4,858,044.

FIELD OF THE INVENTION

The present invention relates to method and apparatus for use with a brushless DC motor which provide the capability of derecting the rotor position when the motor is stopped without the use of known rotor position detecting elements such as Hall elements. The method presented here applies to any type of motor having an excitation flux created by a permanent magnet or by DC current excitation of a winding.

BACKGROUND OF THE INVENTION

Briefly stated, a brushless motor is a motor in which the position of magnetic poles of a rotor are detected by means of a detector directly coupled to the shaft of the rotor. In response to the detected position, semiconductor switching elements such as transistors, thyristors or the like are turn on and off so as to continuously generate torque in the motor. Field windings or a multi-segment permanent magnet is used for the rotor.

The torque is created by application of currents to stator or field windings in sequential order to produce a torque-inducing flux for moving a rotor. The DC currents are alternately switched about the field windings to create various current paths that produce magnetic flux orientations in a synchronized fashion. The magnetic flux so produced results in a torque on the motor that causes the desired rotational movement. In order to ensure that current is applied to the proper motor phase, sensing devices are used to provide information about the position of the rotor. Typically, this information is derived through systems such as Hall sensors, optical sensors or resolvers. These different systems do not give an absolute position, but enough information in order to know the relative position of the rotor in one electrical period. Therefore, it is possible using these devices to energize the motor in such a way that it starts in every case in the correct direction.

Of these, the best known and most commonly used, especially in motors where economy and small size are of significant importance is Hall sensors. However, the position of the Hall elements must be very precisely fixed. Further, the heat resisting temperature of a Hall element is limited, so that deterioration of the characteristics of the motor can occur if the motor is heavily loaded. Another problem with these sensing device is that they are more prone to failure than most of the devices in which they are used. Thus, the Hall device significantly affects the overall reliability of the apparatus that incorporates the sensing device. Also, incorporating these sensing devices in the motor structure itself increases the motor size, cost, complexity and power consumption. A number of wire leads must also be provided to each Hall effect device to bring out the information detected by the Hall device to a microprocessor or the like external to the motor shell.

A number of different solutions to indirect position detection which does not require sensors have been developed. For example, methods disclosed to date include direct or indirect back EMF detection as disclosed in V. D. Hair "direct detection of back EMF in permanent magnet step motors," Incremental Motion Control Systems and Devices, Symposium, Urbana-Champaign, 1983, pp. 219-221, and K. M. King, "Stepping motor control," U.S. Pat. No. 4,136,308, Jan. 23, 1979; current analysis as disclosed in B. C. Kuo, A. Cassat "On current detection in variable-reluctance step motors," Incremental Motion Control Systems and Devices, 6th Annual Symposium, Urbana-Champaign, 1977, pp. 205-220; or third harmonic analysis as disclosed in P. Ferraris, A. Vagati, F. Villata, "PM brushless motor: Self commutating prerogatives with magnetically anisotropic rotor," Instituto di Elettriche, Politecnico di Torino, Italia, and R. Osseni, "Modélisation et auto-commutation des moteurs synchrones," Theses EPFL No. 767, 1989. However, these methods do not give any information about the position of the rotor at standstill. If the electrical drive system has been switched off and the rotor is not turning, it is not possible to know the actual position as related to the stator phases. Thus, at switch on, the motor may start in either the correct or incorrect direction. This may not matter for many applications, but in the many applications such as in driving the spindle motor in a disc drive this incorrect starting direction is not acceptable.

One known effort to determine the starting position without the use of sensors is disclosed in British Patent Publication EPA 251,785. According to this method, a short current pulse is applied to each power phase of the motor, and the resulting motor current is measured to determine the positional information of the rotor based on the return pulse of greatest amplitude. However, the difference between the pulses returned from the different phases may be very small, and may be affected by temperature, differences between the phase inductances, phase resistances, or the use of a relatively high frequency which can create eddy currents.

SUMMARY OF THE INVENTION

The present method and apparatus detects the position with an accuracy of $\pi/m$ electrical radians (where m=the number of motor phases) within one electrical period, and provides enough information to be able to start in the correct direction with certainty. After starting the motor in an open loop mode of one or two steps, starting the rotor in the correct direction, the closed loop mode may be switched on, using a dynamic indirect position detection as is already well known in the technology.

More specifically, the position at start is determined by the injection o short current pulses in different motor phases, each phase or pair of phases being energized first by a pulse of one polarity and of the opposite polarity. The sign of the current difference of the pulses injected in the same phase or pair of phases is detected. By performing a succession of these tests on different phases or pairs of phases of the standing motor, a table of results is established which clearly defines the position of the rotor relative to the motor phases. The same table then defines what polarity currents should be applied to each phase to reliably and certainly start the motor in the proper direction.

This method, in effect, indirectly detects the saturation level of the different motor phases. By using this approach, the measurement is made in such a way that the influence of the temperature on the electrical time constants and the different possible variations in winding parameters do not effect the final detection of the motor position. This method assures starting in the correct direction, and offers the ability to start the motor in the correct direction without back oscillation.

Other features and advantages of the present invention may become apparent to a person who studies the following disclosure given with respect to the accompanying figures.

DETAILED DESCRIPTION OF A PREFERRED EMBODIMENT

Any polarized motor, such as a brushless DC motor, including permanent magnets or excitation windings, has a local stator and rotor saturation level. As a result of the saturation level of the iron magnetic circuit phase inductances are a function of rotor position. The approach taken in the present invention is to measure the saturation level of the phase flux versus the current in a phase for each corresponding phase in such a way that the following parameters cannot influence measurement accuracy:

- temperature effect on resistance in the phase;
- the relatively small differences between the inductances created in the magnetic circuits;
- where a relatively high frequency is used to measure the inductance, secondary effects such as eddy currents.

The method disclosed below and the apparatus used to implement it provide a reliable and efficient approach to determining the starting position for a motor, particularly a small power motor.

In the magnetic circuit of a motor phase winding, with current, two effects are superimposed: 1) the permanent magnet flux (or the DC current excitation winding flux); and 2) the current flux. The total flux in a given phase can be expressed as follows:

$$\Psi \text{ phase} = \Psi PM + L \cdot i$$

Where:

$\Psi$ phase = total flux in the phase $\Psi PM$ = total flux created by the excitation (permanent magnet or DC current excitation) in the corresponding phase $L$ = inductance of the phase; $L$ is a function of the current $i$ and the motor rotor positon $\alpha$ $i$ = current in the phase Consequently, the total flux $\Psi$ phase can be increased or decreased by the current effect, thus modifying the saturation level.

If $\Psi$ phase $> \Psi$ PM, the magnetic circuit is more saturated due to the additional effect of the current $i+$, and the corresponding inductance can be written as:

$$L = Lo - \Delta L^+ \qquad [2]$$

Where;

$Lo$ = inductance of the phase when current equals zero $\Delta L^+$ = incremental change in inductance when current is different from zero ($i^+$)

$i^+$ = current in the phase, the current creates a positive flux (same flux direction than $\Psi$ PM)

On the other hand, if $\Psi$ phase $< \Psi$ PM, the magnetic circuit is less saturated due to the subtracting effect of the current $i^-$, and the inductance can be written as follows:

$$L = Lo + \Delta L^- \qquad [3]$$

Where;

$\Delta L^-$ = incremental change in inductance when current is different from zero ($i^-$)

$i$ = current in phase, the current creates a negative flux (opposite direction than $\Psi$ PM)

Figure 1:
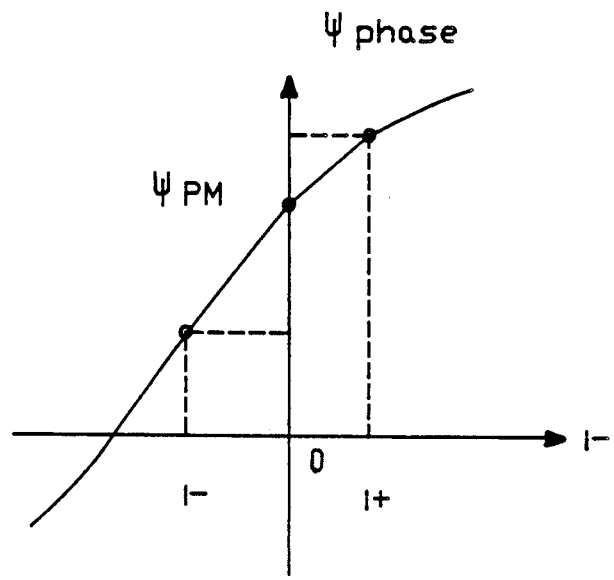
FIG. 1 illustrates phase flux versus current in a phase of a brushless DC motor.

FIG. 1 represents the two possible cases for a given position when motor is in a standstill state.

Current $i^+$ and current $i^-$ are of opposite direction, consequently of opposite sign, and $L = L(i)$.

Instead of directly measuring the inductance, the idea is to analyze the current evolution. At standstill, the phase current can be written as:

$$i = \frac{U}{R}\left(1 - e^{-\frac{R}{L} \cdot t}\right) \text{ that is } e^{-\frac{R}{L} \cdot t} \qquad [4]$$

Where:

U = applied voltage to the phase

R = total resistance of the phase t = time i = current in the phase

Applying equation [4] to the two cases, the current is expressed as follows (see FIG. 2):

$$i^+ = \frac{U}{R}\left(1 - e^{\frac{-R \cdot t}{Lo - \Delta L^+}}\right) \qquad [5]$$

-continued $$i^- = \frac{U}{R}\left(1 - e^{\frac{-R \cdot t}{Lo + \Delta L^-}}\right) \quad [6]$$

Figure 2:
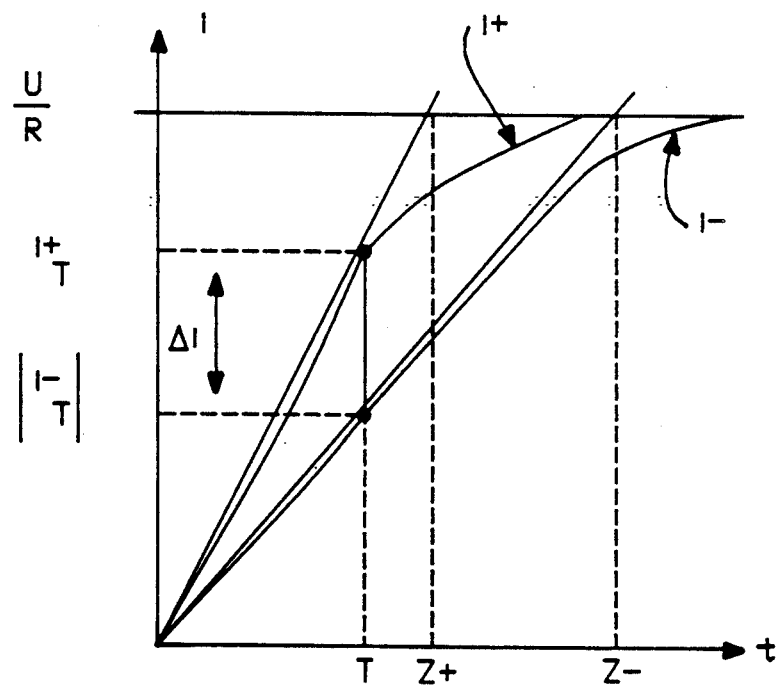
FIG. 2 illustrates current rise versus time in a brushless DC motor.

FIG. 2 shows the two different currents, where current $i^-$ is represented by its absolute value.

Defining a time T, approximately equal to the time constant, it is possible to compare the current amplitudes and mainly the difference of the two currents. The difference of the two currents is equal to:

$$\Delta i = i^+ - |i^-| \quad [7]$$

$$\Delta i = \frac{U}{R}\left(e^{\frac{-R \cdot T}{Lo + \Delta L^-}} - e^{\frac{-R \cdot T}{Lo - \Delta L^+}}\right)$$

The sign of the current difference $\Delta i$ is a characteristic of the current effect superimposed to the excitation flux $\Psi$ PM effect. Three cases have to be considered:

Case 1: $\Delta i > 0$

If $\Delta i$ is greater than zero, it means that the current $i^+$ creates a flux of the same direction as the excitation flux created by the permanent-magnet (or the DC current excitation winding flux). The current $i^-$ creates a flux of opposite direction to the excitation flux.

Case 2: $\Delta i < 0$

If $\Delta i$ is negative, it means that the current $i^+$ creates a flux of opposite direction to the excitation flux. The current $i^-$ creates a flux of the same direction as the excitation flux.

Case 3: $\Delta i = 0$

This case corresponds to a situation where $\Delta L^+ = \Delta L^- \approx 0$ corresponding to a very low saturation level in the corresponding phase.

Consequently, it is possible based on the determination of the sign of the current difference $\Delta i$ to determine the direction of the excitation flux and consequently the rotor position at standstill. This position is given with an accuracy of $\pi$ electrical radians for the corresponding phase.

Figure 3:
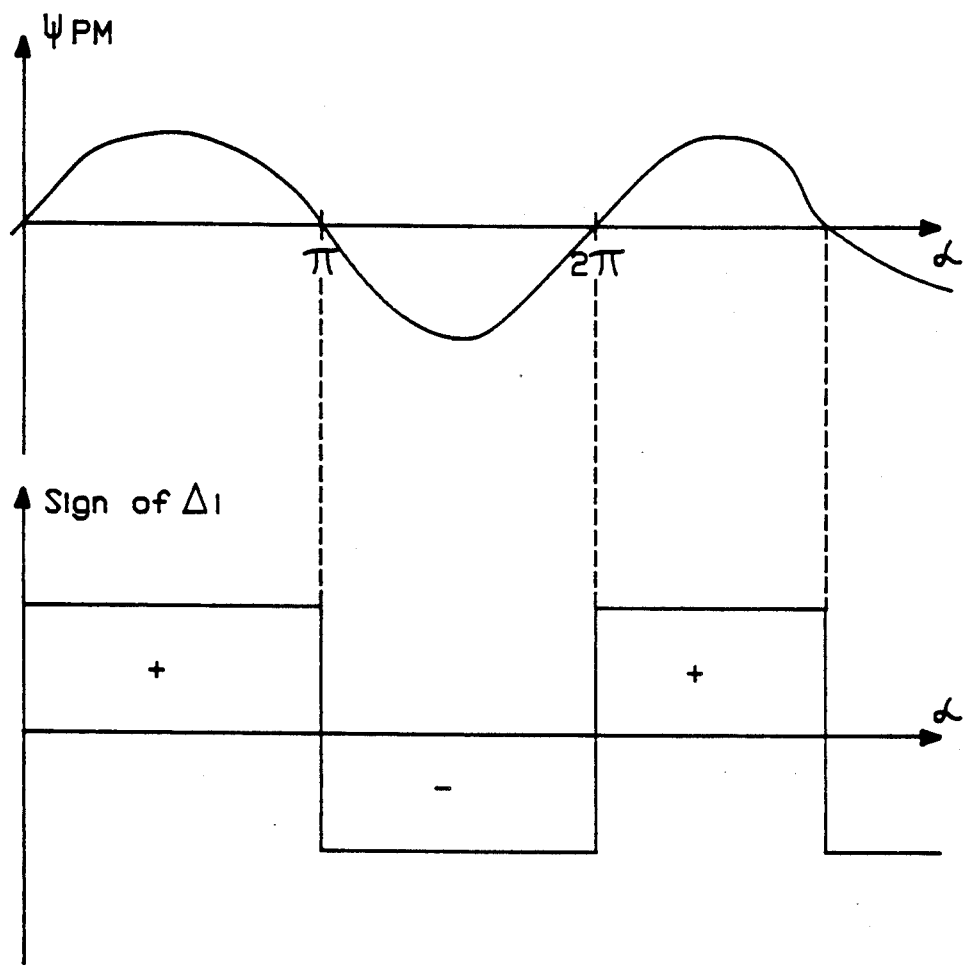
FIG. 3 illustrates the correlation between excitation flux and current difference in a given motor phase versus motor position.

FIG. 3 shows the correlation between the excitation flux $\Psi$ PM and the sign of the current difference $\Delta i$ versus the rotor position (motor at standstill).

In a motor having m phases, such a measurement of the sign of the current difference $\Delta i$ can be determined in each phase. The corresponding determination of the rotor position is therefore given with an accuracy of $\pi/m$ electrical radian. That is, the accuracy with which rotor position is determined is greater where a sequence of the different phases of the motor are excited at standstill.

Figure 4:
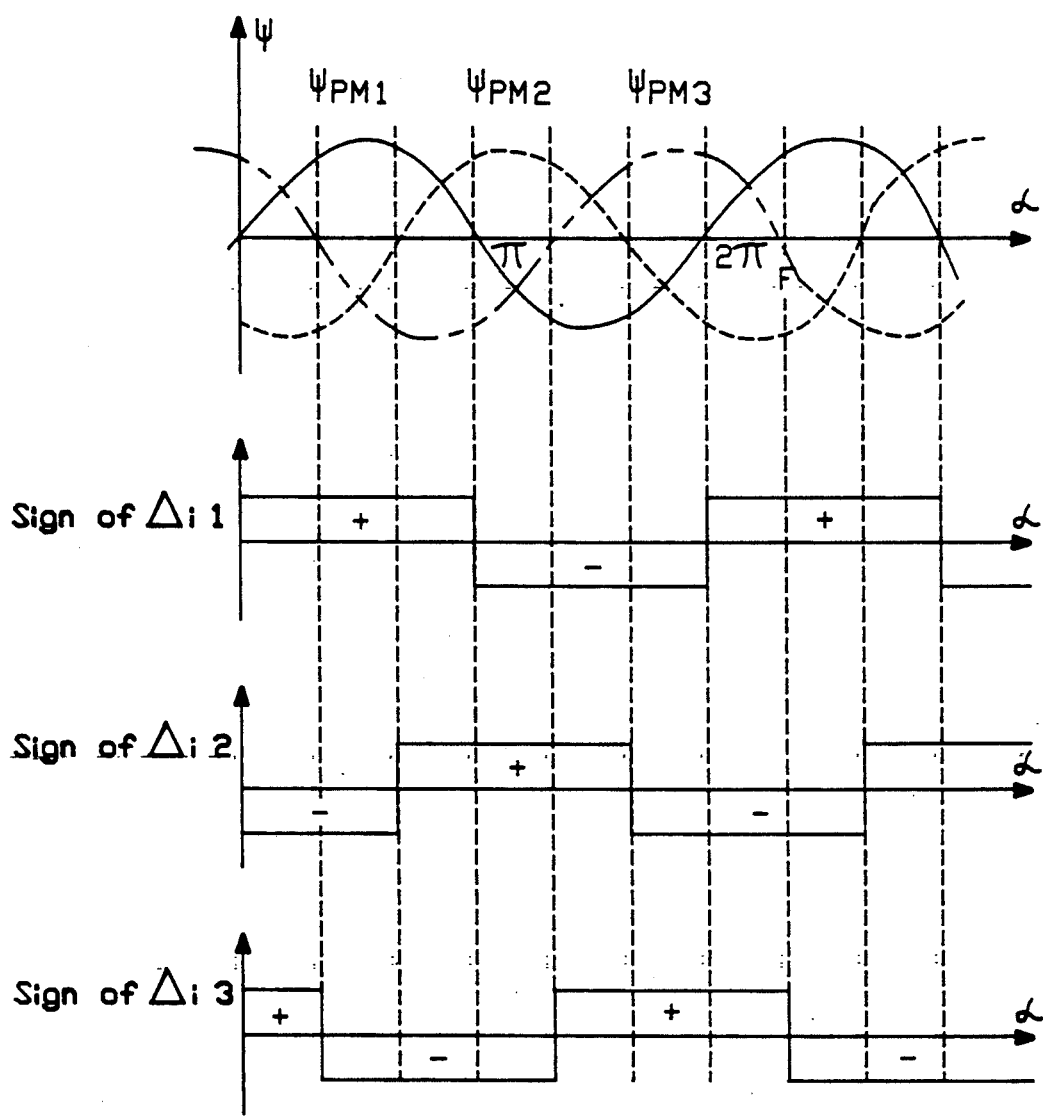
FIG. 4 illustrates the correlation between the different excitation flux and corresponding motor current differences for a three-phase motor.

For example, for a three-phase motor, the excitation flux created by the permanent magnet (or the DC current excitation winding) are shifted from one phase to the other by $2\pi/m$ electrical radian (m=3). The measurements of the current difference $\Delta i$ in each phase permits to determine the rotor position with an accuracy of $\pi/3=60$ electrical degrees. FIG. 4 shows such a configuration, and the correlation between the different excitation flux $\Psi$ PM and the corresponding current differences $\Delta i$, for a three-phase motor.

$\alpha$ = motor rotor position in electrical degree
$\Psi$PM1 = excitation flux in phase 1
$\Psi$PM2 = excitation flux in phase 2
$\Psi$PM3 = excitation flux in phase 3
$\Delta i_1$ = current difference in phase 1
$\Delta i_2$ = current difference in phase 2
$\Delta i_3$ = current difference in phase 3

Consequently, there is a unique distribution of the signs of the different current differences and the motor rotor position over one electrical period of the excitation flux for any given motor such that by exciting the phases of the motor and defining a table of the signs of the current differences, the rotor position can be uniquely and accurately established.

Another way to measure indirect saturation detection is current integration. Instead of measuring the current difference, it can be interesting for electronic advantages to measure the difference of the current integration.

The integration of the current is defined as follows:

$$\int_O^T i^+ \, dt = \int_O^T \frac{U}{R}\left(1 - e^{\frac{-R \cdot t}{Lo - \Delta L^+}}\right) \cdot dt \quad [8]$$

$$\int_O^T i^- \, dt = \int_O^T \frac{U}{R}\left(1 - e^{\frac{-R \cdot t}{Lo + \Delta L^-}}\right) \cdot dt \quad [9]$$

The difference in the current integration is given by:

$$\Delta ii = \int_O^T i^+ \cdot dt - \int_O^T |i^-| \cdot dt$$

A decision on rotor position can be made based on the difference in the current integration $\Delta ii$ rather than the difference in the current $\Delta i$.

Consequently, this approach gives the same result and the same rotor position determination with an accuracy of $\pi/m$ electrical radian, where m is equal to the number of motor phases.

Figure 5:
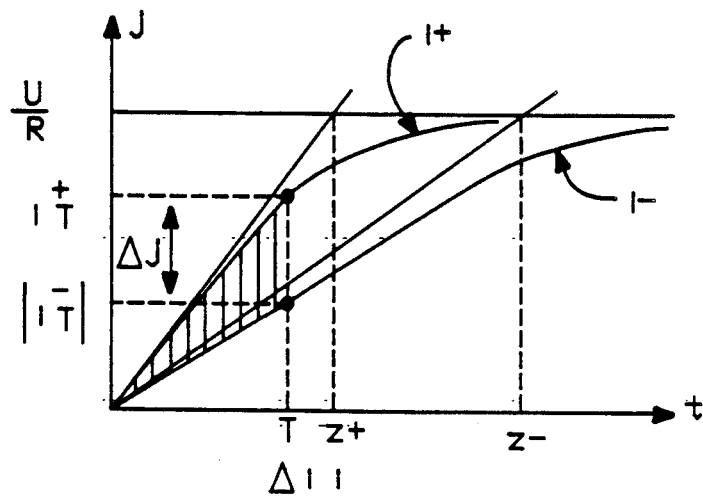
FIG. 5 illustrates the difference which it can be detected by integration of the resulting phase current.

FIG. 5 shows the corresponding currents and the difference of the current integration $\Delta ii$. This figure illustrates that integration emphasizes the difference between the flux induced by the currents of opposite direction, and thereby enhances the accuracy of the method. Thus, integration is considered the preferred approach, which gives the most accurate results.

Another possible way to measure the same phenomena which gives the same result is to determine the sign of the difference of the current derivative. The derivative of the current is defined as follows:

$$\frac{di}{dt} = \frac{U}{L} e^{\frac{-R \cdot t}{L}} \quad [10]$$

and for the configuration under consideration:

$$\frac{di^+}{dt} = \frac{U}{Lo - \Delta L^+} e^{\frac{-R \cdot t}{L - \Delta L^+}} \quad [11]$$

$$\frac{di^-}{dt} = \frac{U}{Lo + \Delta L^-} e^{\frac{-R \cdot t}{L + \Delta L^-}} \quad [12]$$

Defining the difference of the current derivatives as follows:

$$\Delta di = \left| \frac{di^-}{dt} \right| - \frac{di^+}{dt} \quad [13]$$

at time $t = T$ $$\Delta di = \quad [14]$$

$$\left( U \frac{1}{Lo + \Delta L^-} e^{\frac{-R \cdot T}{Lo+\Delta L^-}} - \frac{1}{Lo - \Delta L^+} e^{\frac{-R \cdot T}{Lo-\Delta L^+}} \right)$$

The sign of $\Delta di$ permits determination of the rotor position similarly to the approach defined when using the sign of the current difference $\Delta i$.

Figure 6:
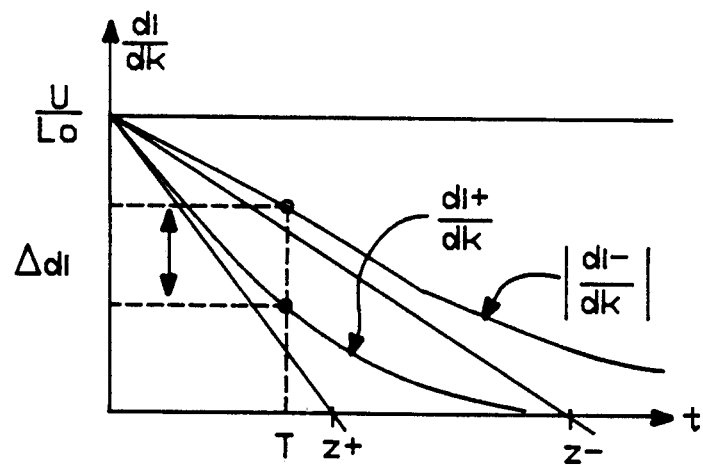
FIG. 6 illustrates the difference which can be established by differentiation of the resulting phase current.

FIG. 6 shows the corresponding derivatives of the current.

Figure 7:
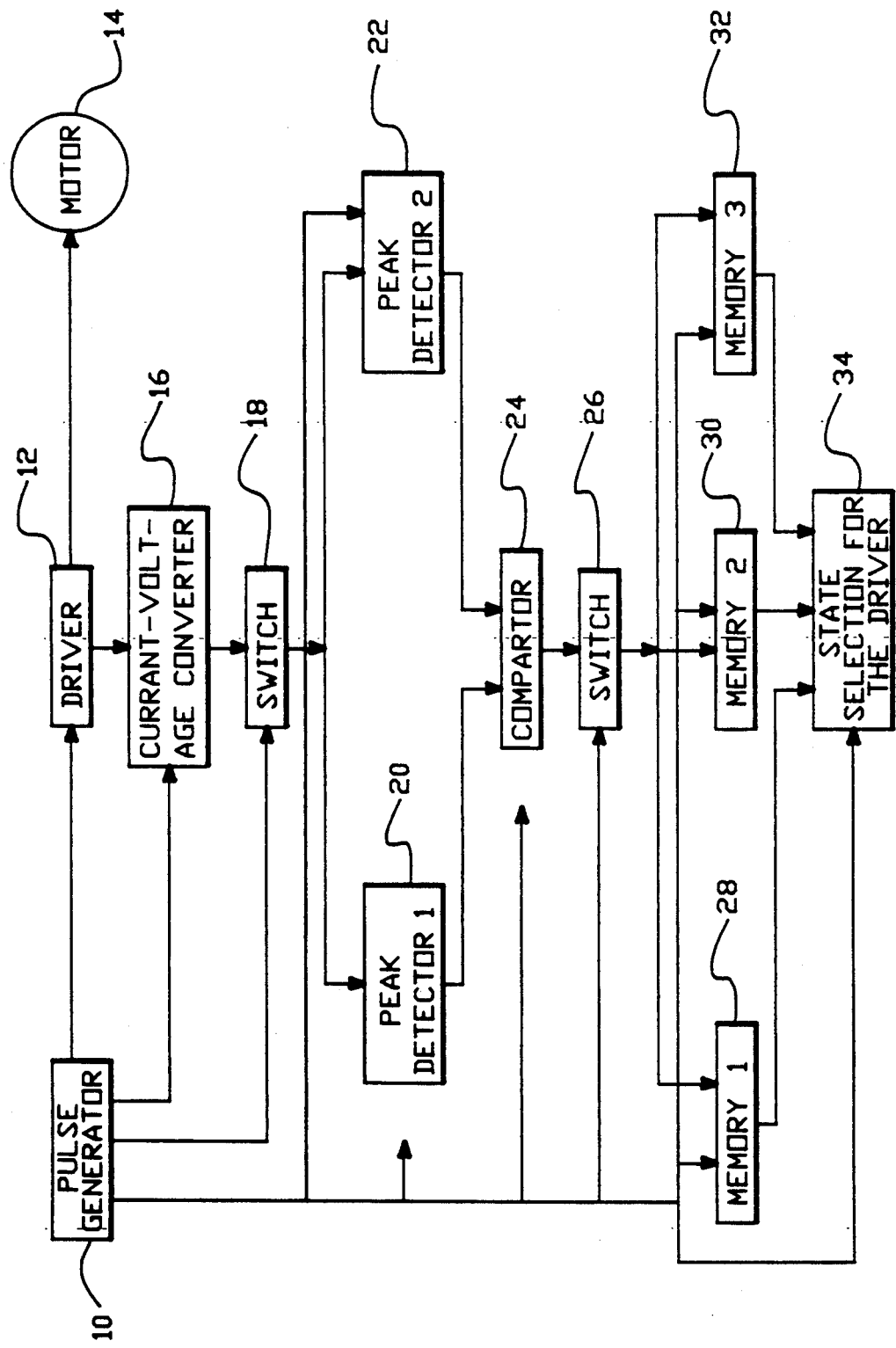
FIG. 7 is a block diagram which may be used to understand the approach to position detection according to the present invention.

An example of the process used to measure rotor position at standstill using the method of the present invention is given with respect to FIG. 7 for a three-phase motor. The process as described in the apparatus and step shown are not intended to be exhaustive, but merely as an example.

According to this exemplary process, using a pulse generator 10 through a driver 12, each phase of a motor 14 is supplied first with a positive current through the driver 12. The resulting current is converted to a voltage through a current voltage converter 16. Each phase is supplied the current for a time T. The final value of the current, after time T, is stored by use of a switch 18 in a peak detector 20. The same phase is now energized using a negative current through driver 12, and the resulting current converted to a voltage at converter 16 and through switch 18 stored at peak detector 22. The two peak current values are compared at comparator 24, with the difference in magnitude not being established, but only the sign of the magnitude. The sign of the current difference is routed via switch 26 to a memory 28.

The above procedure is repeated for each other phase or set of phases. In the case of a three-phase motor, this means that three signs are determined at comparator 24, with the second result being stored in memory 30 and the third result at memory 32. Based on the signs of the current differences obtained as described above, and using a look-up table to be shown below, a state selection of the phase or phases to be energized in order to start the motor moving in a chosen direction is determined 34.

Figure 8:
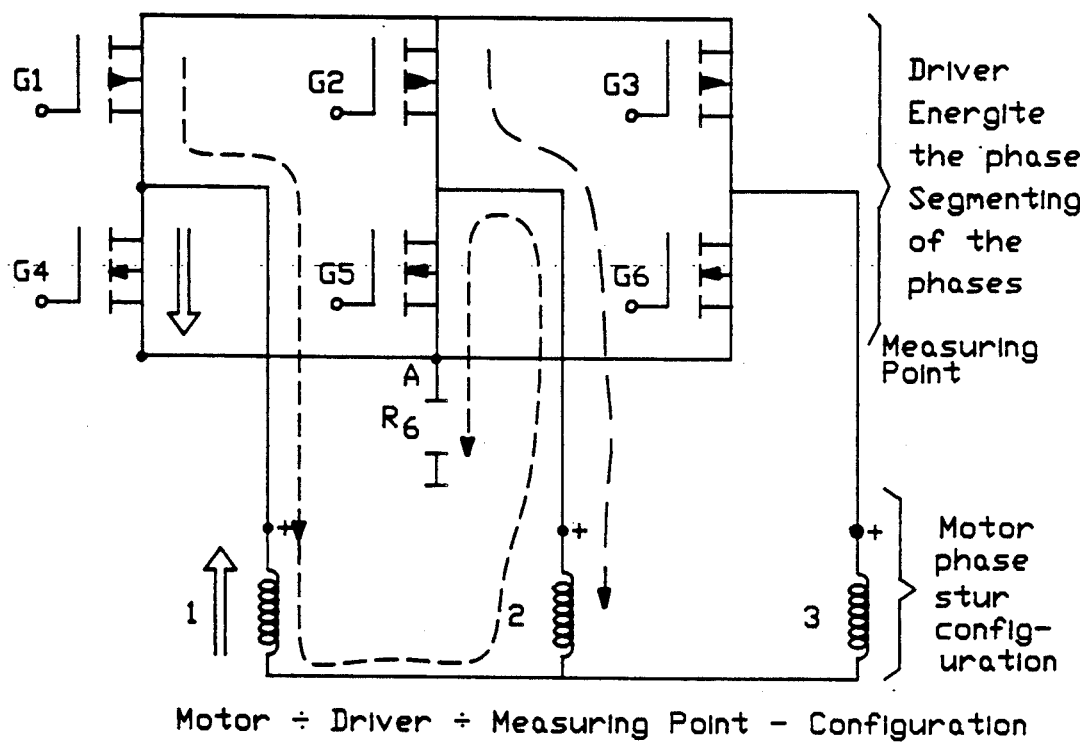
FIG. 8 is a schematic of the motor energization according to the present invention.
Figure 8A:
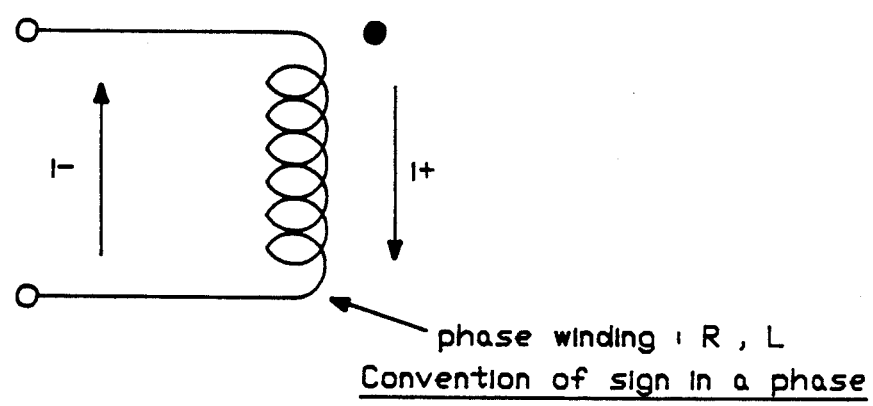
Figure 9:
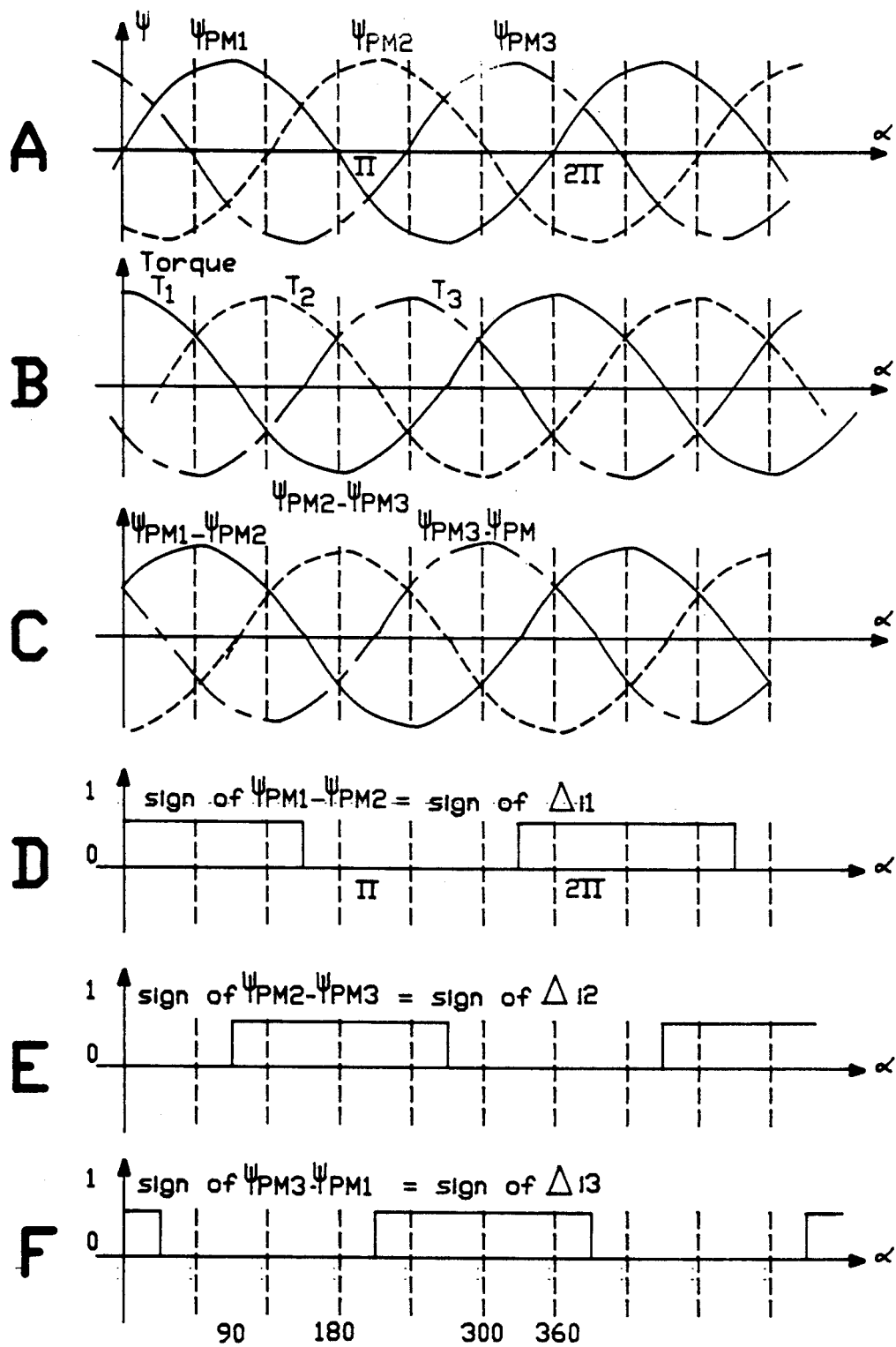
FIG. 9 illustrates flux distribution versus torque versus the sign of the resulting current difference in a motor being energized to determine motor position according to the present invention.

This last part of the method, that is selection of the phases to be energized in order to start the motor in the chosen direction, can be explained with respect to FIGS. 8 and 9.

Considering, for example, a star configuration of the phases as illustrated in FIG. 8, the measurement of the current difference is made when two phases in series are energized for each possible configuration. These configurations are Phase 1 and Phase 2 in series; Phase 1 and Phase 3 in series; and Phase 2 and Phase 3 in series. Referring to this FIG. 8, the first combination of Phase 1 and Phase 2 is energized to cause a current to pass therethrough by turning on transistors G1 and G5, causing the current to pass from G1 through Phase 1 to Phase 2 and through the resistor R6 to ground, with the current being measured at the point A.

These transistors are switched off, and a current in the opposite direction is caused to pass through the same series pair of phases by turning on transistors G2, G4 with the current being measured at the same point. The difference in the currents is then determined either by subtraction of the values, or by first integration and then determination of the difference, or differentiation and determination of the difference, all as explained as above. The difference is stored as a one or zero representing positive or negative. The convention to be adopted in explaining this specific example is that if the signs of the current difference is positive, the function will be considered to be equal to be one; if the sign of the current difference is negative, then the function is considered to be equal to zero. The remaining current differences for the phase configuration are measured by appropriate switching of the transistor G1-G6.

Referring next to FIG. 9, it represents the flux distribution and the corresponding torque which can be created. Thus, the top line, Line A, represents the different excitation flux in the phases, $\Psi$ PM1, $\Psi$ PM2, $\Psi$ PM3, versus the motor rotor position. The second line, Line B, represents the different phase torques, T1, T2, T3, and thereby illustrates the static torque which can be created. The third line, line C, shows the flux differences, the first difference $\Psi$ PM1 $-$ PM2, the second difference $\Psi$ PM2 $- \Psi$ PM3, the third difference $\Psi$ PM3 $- \Psi$ PM1. The fourth line, Line D, represents the current difference $\Delta i1$. The fifth line, Line E, represents the current difference sign $\Delta i2$. The sixth line, Line F, represents the current difference sign $\Delta i3$.

The torque is then determined as follows:

$$T1 = \frac{d\Psi\ PM1}{d\alpha} \cdot \frac{d\alpha}{dt} \cdot i1 \quad [15]$$

$$T2 = \frac{d\Psi\ PM2}{d\alpha} \cdot \frac{d\alpha}{dt} \cdot i2$$

$$T3 = \frac{d\Psi\ PM3}{d\alpha} \cdot \frac{d\alpha}{dt} \cdot i3$$

The determination of the first switching sequence based on the measurement of the sign of the current differences is based on the following:

sign of $\Delta i1 =$ sign of $\Psi$ PM1 $= \Psi$ PM2 )
sign of $\Delta i2 =$ sign of $\Psi$ PM2 $= \Psi$ PM3 ) Two phases in serial
sign of $\Delta i3 =$ sign of $\Psi$ PM3 $= \Psi$ PM1 )

In order to obtain a positive torque, the following state function can be defined:

iK energized positively = state function of iK = 1
iK energized negatively = state function of iK = 0
with K = 1, 2, 3

Then the following table gives the first switching sequence:

| Electrical Degree | Sign of | | | State Function of | | |
|---|---|---|---|---|---|---|
| | $\Delta i1$ | $\Delta i2$ | $\Delta i3$ | i1 | i2 | i3 |
| 0–30 | 1 | 0 | 1 | 1 | 0 | 0 |
| 30–90 | 1 | 0 | 0 | 1 | 1 | 0 |
| 90–150 | 1 | 1 | 0 | 0 | 1 | 0 |
| 150–210 | 0 | 1 | 0 | 0 | 1 | 1 |
| 210–270 | 0 | 1 | 1 | 0 | 0 | 1 |
| 270–330 | 0 | 0 | 1 | 1 | 0 | 1 |
| 330–360 | 1 | 0 | 1 | 1 | 0 | 0 | with: state function
i1 = $\Delta i2$
i2 = $\Delta i3$
i3 = $\Delta i1$

This defines how to start the motor in motion in the proper direction. That is, based on the sign of the current difference as shown in the first three columns of the table, then the currents must be applied to the phases of the motor as shown in the last three columns under the head "State Function" in order to create the torque to start the motor in the right direction. This table is also reflected in lines D, E and F of FIG. 9, which illustrate the pattern with which the sign of the current difference change with differing positions of the motor as it has stopped. Once the table is established by defining the set of signs (represented by ones and zeros), then the proper current to be applied to the different phases to start in the desired direction will be known.

Figure 10A:
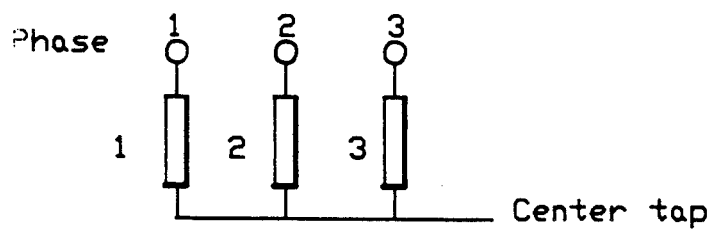
FIG. 10A shows a three-phase star configuration of stator windings.

Other alternatives may become apparent to a person of skill in the art who studies the invention disclosure. For example, consider a three-phase brushless DC motor connected in a star configuration with a center tap as shown in FIG. 10A. The following possible approaches may be taken to detect the position at standstill. The first possibility, shown schematically in FIG. 10B, determines the sign of the current difference (*) as measured between pairs of phases. This is the approach described in detail above.

Figure 10B:
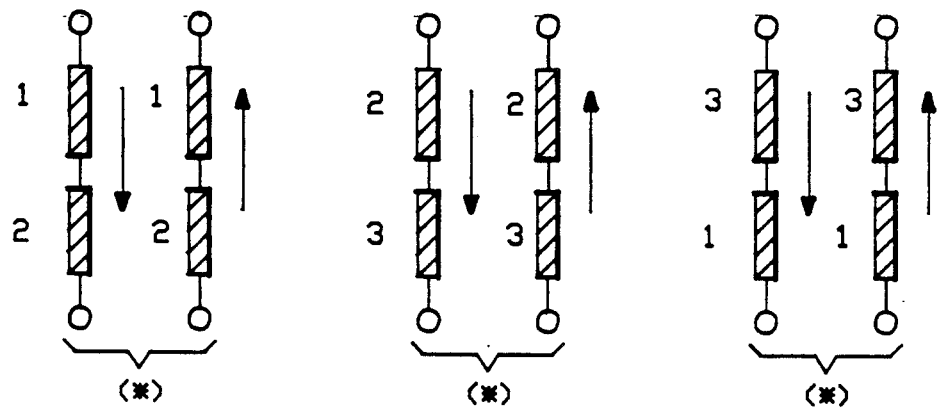
FIGS. 10B-10D show three possible approaches of stator winding connections for detecting the rotor position at standstill.
Figure 10C:
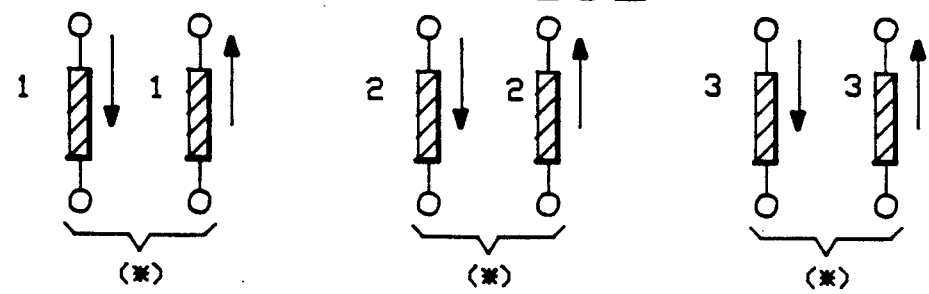

In the second possible approach, FIG. 10C, currents run in opposite directions through one phase at a time. The current difference (*) is measured between each phase and the center tap.

Figure 10D:
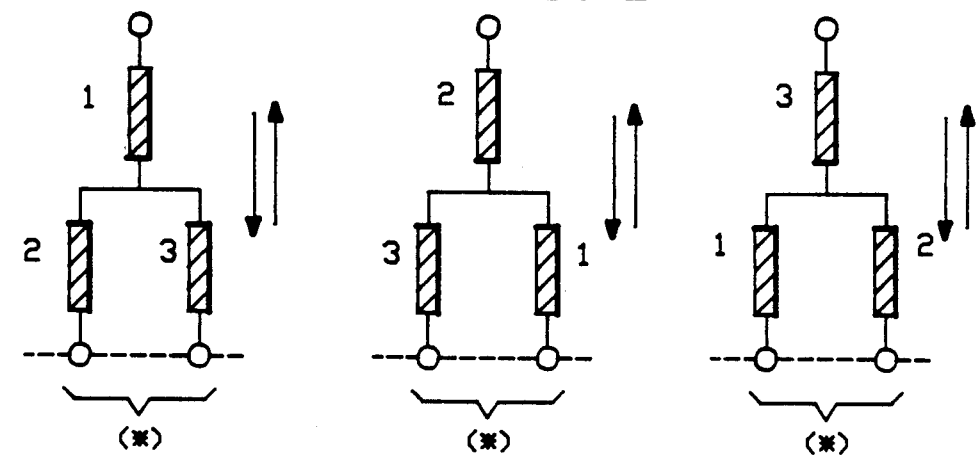

In a third possible approach (FIG. 10D), a combination of phases is formed comprising a phase connected in series with the two other phases connected in parallel. The current difference (*) is then measured as indicated between the phase combination and the center tap.

Another approach is to combine the results achieved from the methods of FIG. 10B and FIG. 10C. This detects position with an accuracy of $\pi/2$ m, approximately doubling the accuracy of the methods described above. Thus, the scope of the invention is limited only by the following claims.

What is claimed is:

1. A commutatorless direct current motor comprising:
    a plurality of stator windings connected to define m phases of said motor;
    a permanent magnet or DC current excitation winding positioned relative to said stator windings and rotatable relative to said stator windings and comprising means for establishing first, fixed magnetic field; driver means connected to said plurality of stator windings for applying short term current pulses, first of one polarity and then of an opposite polarity, to at least one phase thereof for inducing at least one second, controlled magnetic field;
    monitoring means for detecting each current established by said applied current pulses, each said current representing the interaction of said first, fixed magnetic field and said second, current pulse induced magnetic field;
    comparator means for determining the sign of the difference between said first polarity pulse and said second opposite polarity pulse for each of said driven phases; and
    detection means for identifying a rotational position of said magnet relative to said stator windings based on said sign of the difference between the response to said pulses for each of said driven phases.

2. The motor of claim 1 wherein said monitoring means detects the peak voltage at a current voltage converter coupled to said driver phase obtained in response to the application of each current pulse.

3. The motor of claim 1 wherein said monitoring means includes means for integrating the current response to each said applied current pulse, the rotational position being identified based on the sign of the difference in the integrals.

4. The motor of claim 1 wherein said monitoring means includes means for differentiating the current response to each said applied current pulse, the rotational position being identified based on the sign of the difference in the differentials.

5. The motor of claim 1 wherein said stator windings are arranged in three phases, said phases being selectively connected in pairs so that the current pulses are applied with alternating polarities to each pair of said plurality of pairs.

6. A commutatorless direct current motor comprising:
    a plurality of stator windings connected to define m phases of said motor;
    a permanent magnet or DC current excitation winding positioned relative to said stator windings and rotatable relative to said stator windings and comprising means for establishing first, fixed magnetic field;
    driver means connected to said plurality of stator windings for applying short term current pulses, first of one polarity and then of an opposite polarity, to at least two different combinations of phases thereof comprising at least one phase connected in series with at least a pair of phases connected in parallel, for inducing at least two second, controlled magnetic fields,
    monitoring means for detecting each current established by said applied current pulses, each said current representing the interaction of said first, fixed magnetic field and said second, current pulse induced magnetic fields,
    comparator means for determining the sign of the difference between the response to said first polarity pulse and the response to said second opposite polarity pulse for each of said driven phase; and
    detection means for identifying a rotational position of said magnet relative to said stator windings based on the sign of the difference between the response to said pulses for each of said driven phases.

7. The motor of claim 6 wherein said monitoring means detects the peak voltage at a current voltage converter coupled to said driver phase obtained in response to the application of each current pulse to each said phase combination of windings.

8. The motor of claim 6 wherein said monitoring means includes means for integrating the current response to each said applied current pulse, the rotational position being identified based on the sign of the difference in the integrals.

9. The motor of claim 6 wherein said monitoring means includes means for differentiating the current response to each said applied current pulse, the rotational position being identified based on the sign of the difference in the differentials.

10. In a brushless DC motor having multiple windings arranged as a stator and a permanent magnet motor or a DC current excitation winding, a method for controlling ordered application of electrical current to the stator windings and measuring the response thereto to determine the initial position of said rotor comprising the steps of coupling circuit means to the stator windings for selectively establishing current paths through a selected stator winding or windings in response to control signals, applying short duration current pulses of first and second opposite polarities to energize each said selected winding, detecting the voltage detected at a current voltage converter connected to the energized phase by each of said applied current pulses of opposite polarities, determining the sign of the difference between the response to said first polarity pulse and the response to said second opposite polarity pulse for each of said driven phases; and identifying a rotational position of said magnetic motor relative to said stator windings based on said sign of the difference between said response to said pulses applied to said selected stator winding.

11. The motor of claim 10 wherein said determining step includes integrating the current response to each said applied current pulse, the rotational position being identified based on the sign of the difference in the integrals.

12. The motor of claim 10 wherein said determining step includes differentiating the current response to each said applied current pulse, the rotational position being identified based on the sign of the difference in the differentials.

13. The motor of claim 10 wherein said stator windings are arranged in three phases, said phases being selectively connected in pairs so that the current pulses are applied with alternating polarities to each pair of the plurality of pairs.

14. The motor of claim 10 wherein said short duration current pulses are applied to series connected stator windings.

15. The motor of claim 10 wherein said short duration current pulses are applied to sets of said stator windings comprising a winding connected in series with a pair of windings connected in parallel.

16. The motor of claim 10 wherein the rotational position is determined based on first applying selected current pulses to each individual winding of said stator windings, and thereafter to each potential series connected pair of said stator windings.

* * * * *